United States Patent
Dickinson

(10) Patent No.: US 11,951,915 B2
(45) Date of Patent: Apr. 9, 2024

(54) FASTENER CLIP WITH PUSH NUT

(71) Applicant: Termax LLC, Lake Zurich, IL (US)

(72) Inventor: Daniel James Dickinson, Lincolnshire, IL (US)

(73) Assignee: TERMAX COMPANY, Lake Zurich, IL (US)

( * ) Notice: Subject to any disclaimer, the term of this patent is extended or adjusted under 35 U.S.C. 154(b) by 531 days.

(21) Appl. No.: 16/815,304

(22) Filed: Mar. 11, 2020

(65) Prior Publication Data

US 2020/0331409 A1    Oct. 22, 2020

Related U.S. Application Data

(60) Provisional application No. 62/837,190, filed on Apr. 22, 2019.

(51) Int. Cl.
| | | |
|---|---|---|
| *F16B 37/04* | (2006.01) | |
| *B60R 13/02* | (2006.01) | |
| *F16B 5/02* | (2006.01) | |
| *F16B 29/00* | (2006.01) | |

(52) U.S. Cl.
CPC ........ *B60R 13/0206* (2013.01); *F16B 5/0208* (2013.01); *F16B 29/00* (2013.01); *F16B 37/043* (2013.01)

(58) Field of Classification Search
CPC ........ F16B 29/00; F16B 37/043; F16B 37/02; F16B 37/04
USPC .................................................. 411/174, 175
See application file for complete search history.

(56) References Cited

U.S. PATENT DOCUMENTS

| | | | | |
|---|---|---|---|---|
| RE22,618 E | * | 3/1945 | Johnson ................. | F16B 37/04 |
| | | | | 411/112 |
| 2,560,961 A | * | 7/1951 | Knohl .................... | F16B 37/122 |
| | | | | 411/173 |
| 3,006,231 A | * | 10/1961 | Kahn ..................... | F16B 5/0291 |
| | | | | 470/23 |
| 3,342,098 A | * | 9/1967 | Schuplin ............... | F16B 37/043 |
| | | | | 411/15 |
| 3,486,158 A | * | 12/1969 | Soltysik ............... | H01R 12/714 |
| | | | | 439/444 |
| 4,070,945 A | * | 1/1978 | Kurosaki .............. | F16B 37/043 |
| | | | | 411/182 |
| 4,460,298 A | * | 7/1984 | Solarz .................. | F16B 37/043 |
| | | | | 411/908 |
| 5,593,262 A | * | 1/1997 | Gedeon ................. | F16B 37/043 |
| | | | | 411/182 |
| 5,632,584 A | * | 5/1997 | Acevedo ............... | F16B 37/043 |
| | | | | 411/182 |
| 5,746,559 A | * | 5/1998 | Shirai ................. | B60Q 1/0683 |
| | | | | 411/437 |

(Continued)

*Primary Examiner* — Gary W Estremsky

(57) ABSTRACT

A system and method including a fastener clip, including one or more legs, one or more wings attached to the legs, and threads between the one or more legs. The fastener clip is configured to be inserted into and to attach to a slot in a chassis. The wings include ledges. The fastener clip is configured to attach to the slot based at least upon the ledges being configured to engage the slot. The threads form a barrel configured to receive a screw. The fastener clip is configured to couple a component to the chassis based at least upon the screw being configured to be coupled to the component and to be screwed into the threads.

12 Claims, 7 Drawing Sheets

(56) References Cited

U.S. PATENT DOCUMENTS

| | | | | |
|---|---|---|---|---|
| 5,791,845 A * | 8/1998 | Fulop | .................... | F16B 13/124 |
| | | | | 411/908 |
| 5,829,934 A * | 11/1998 | Danby | .................. | F16B 37/043 |
| | | | | 411/173 |
| 6,315,510 B1 * | 11/2001 | Sturies | .................... | F16B 13/00 |
| | | | | 411/60.2 |
| 2008/0086850 A1 * | 4/2008 | Smith | .................... | F16B 21/076 |
| | | | | 24/458 |
| 2008/0159824 A1 * | 7/2008 | Okada | .................... | F16B 37/02 |
| | | | | 411/177 |
| 2011/0072625 A1 * | 3/2011 | Hemingway | ....... | F16B 37/0842 |
| | | | | 24/457 |
| 2013/0287521 A1 * | 10/2013 | Benedetti | .............. | F16B 5/0642 |
| | | | | 24/458 |
| 2015/0107060 A1 * | 4/2015 | Ortega Dona | ........ | F16B 37/043 |
| | | | | 24/295 |
| 2016/0252127 A1 * | 9/2016 | Hattori | .................... | F16B 37/02 |
| | | | | 411/523 |
| 2017/0009780 A1 * | 1/2017 | Yano | ....................... | F02B 39/16 |

* cited by examiner

FASTENER CLIP WITH PUSH NUT

A. BACKGROUND

The invention relates generally to devices for fastening objects, and more particularly to a fastener clip assembly for insertion into an engagement structure, such as a vehicle chassis, a hollow substrate, a wall, a plate, or any suitable surface.

A number of devices and fasteners are currently available for fastening panels, such as body panels and automobile interior trim piece panels, to the chassis of a vehicle. As used herein, a body panel refers to, for example, any interior or exterior body panel on a vehicle, a plastic interior trim piece, door panel, headliner or any interior trim piece. Additionally, the panel may be any suitable exterior body panel, such as a fender, bumper, quarter panel or door panel. The chassis of the vehicle may include any substrate, plate, body panel, structural framework, chassis component or subcomponent, wall or any suitable object.

These conventional fastener devices provide approximately relatively equal levels of insertion and extraction force. These body panels often attach to the chassis of an automobile with a relatively high level of insertion force while providing a relatively low level of extraction force.

Fastener clips, such as two-piece fasteners (multi-piece), are known for attaching body panels to an automobile chassis. Two-piece fasteners are used so that if the panels are removed after original installation, such as to service the components in the door, they may be pulled apart so that one portion remains attached to the sheet metal while the other remains attached to the trim panel. The two pieces may also be reattached after separation. However, two-piece fasteners require manufacturing of multiple pieces and labor-intensive assembly of the two pieces and thus are relatively expensive.

One-piece fasteners are typically less expensive than two or multi piece fasteners. One-piece fasteners have a base to attach to a body panel and a post attached to the base and wings attached at least to the top of the post at a tip of the fastener for fastening to a frame slot. However, if the frame slot and the fastener are misaligned then the forces on the wings are unequal since the wing closest to the slot edge will experience higher wing compression while the other wing will have insufficient springing force to engage the slot. As the clip is forced into the slot, such high forces on one wing may cause the wing to break off thus rendering the fastener incapable of fastening the body panel to the frame. Worse, the broken, damaged or weakened wing can cause detachment of the body panel or contribute to rattles.

The wings of conventional fasteners have a sharp, unsmooth groove to engage the edge of the frame slot. When the clip is removed however, the sharp edges of the frame slot cut into the softer plastic and cut the groove. During manufacture, the slots are typically formed in the frame of the vehicle, such as in an inner roof or door sheet metal structure, by punching the sheet metal. As the punch enters the sheet metal, the outer part of the sheet metal is pushed toward the inside and a metal puncture or ridge is formed on the inside of the sheet metal. The resulting slot edge on the outer part of the slot is relatively smooth; however, the inner part of the slot edge is sharp and rough. Upon removal of the fastener clip, the sharp edges of the frame cut off the groove so that the clip may not be reinserted and reusable.

If the slot is off-center or if the sheet metal varies in thickness or if tolerances in production of the slot in the vehicle chassis or in the trim-piece exist, for example, then engagement of one portion of the hole in the chassis with one of the wings may not provide suitable frictional engagement. Twisting of the body panel will be likely more prevalent because less than all contact points are actually made with the slot of the vehicle chassis. As a result, conventional single piece fasteners do not self-align themselves when the fastener and the body panel are misaligned and are prone to wing breakage such that the fastener cannot be re-attached.

Conventional fasteners typically do not adequately secure the panel to the vehicle chassis having variations in slot size and location or sheet metal with different curvature or thicknesses throughout. Conventional single piece fasteners do not self-align themselves when the fastener and the body panel are misaligned and are prone to wing breakage such that the fastener cannot be re-attached. Also, conventional fasteners are not suitable when subjected to a variety of environmental conditions, such as in the presence of vibration at various levels of amplitude and frequency. For example, conventional fasteners of this type typically do not prevent or minimize the amount of buzzing, rattling or any other type of noise that may cause attention to the occupants of the vehicle or otherwise weaken the attachment. Conventional fasteners do not adequately accommodate various levels of production tolerances, such as various dimensions amongst, for example, the body panels as well as the vehicle chassis. Thus, conventional fastener devices typically do not self-align nor adequately fasten to a range of sheet metal thicknesses and do not minimize or eliminate buzzing and rattling and do not sufficiently accommodate variations in production tolerances. As a result, wear, squeaks, rattles, buzzing, corrosion and loss of elasticity and loss of sealing may result, especially after years of vehicle operation and exposure to vibration, heat, humidity, and other environmental conditions.

B. BRIEF DESCRIPTION OF THE DRAWINGS

Other objects and advantages of the invention may become apparent upon reading the detailed description and upon reference to the accompanying drawings.

Figure 1:
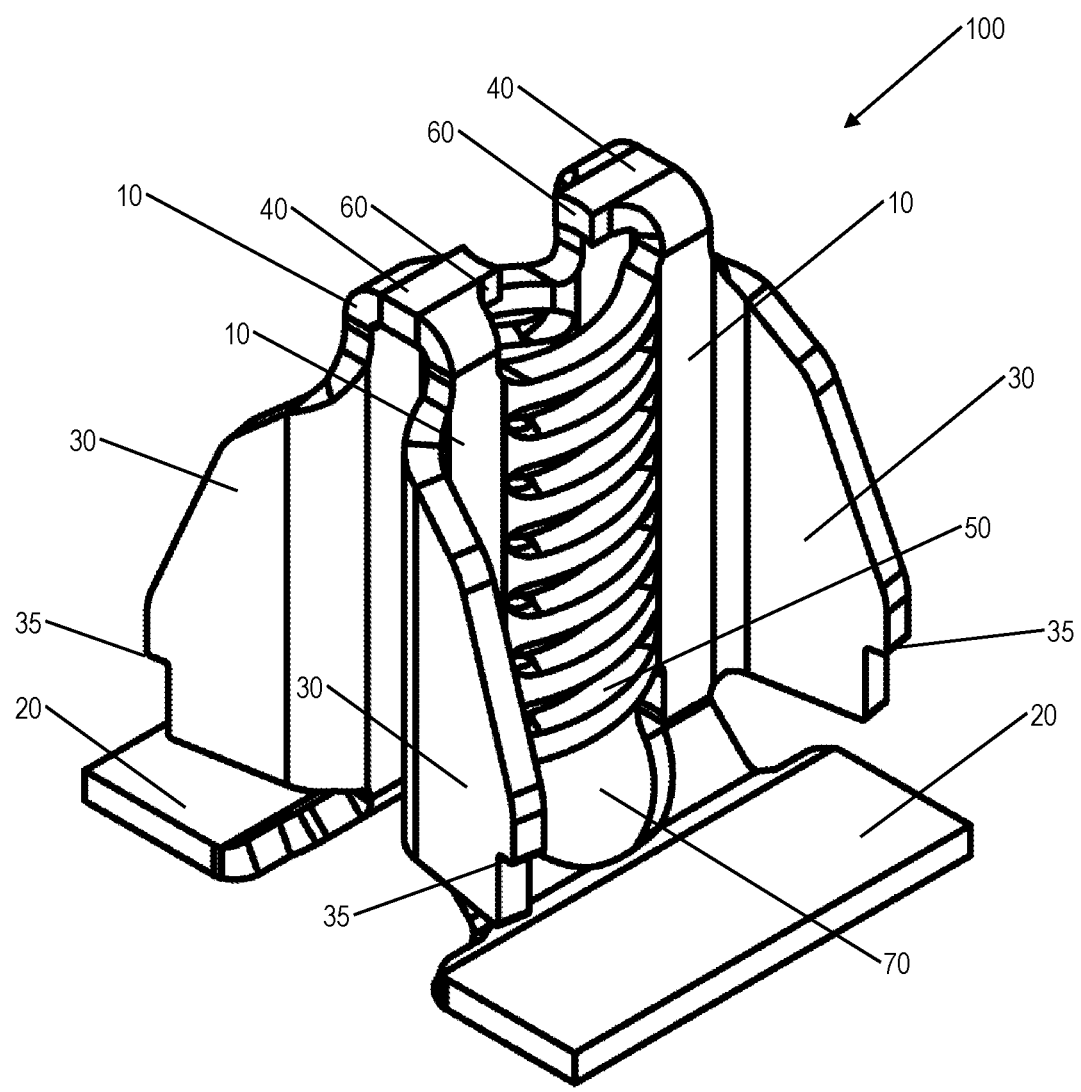
FIG. 1 is a perspective view of a fastener clip configured to receive a nut, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

C. DETAILED DESCRIPTION

FIG. 1 is a perspective view of a fastener clip configured to receive a nut, in accordance with some embodiments.

Figure 2:
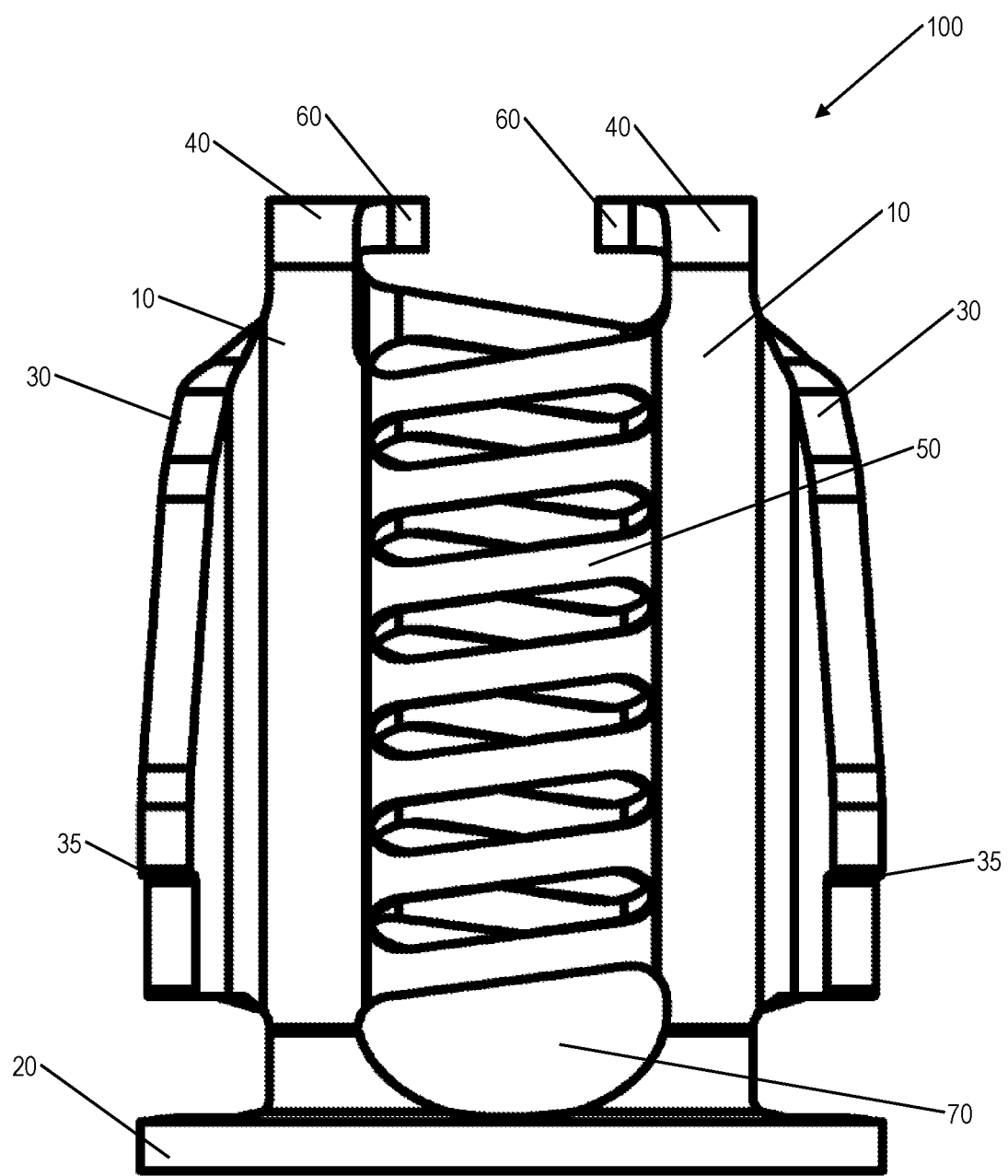
FIG. 2 is a side view of a fastener clip configured to receive a nut, in accordance with some embodiments.

FIG. 2 is a side view of a fastener clip configured to receive a nut, in accordance with some embodiments.

Figure 3:
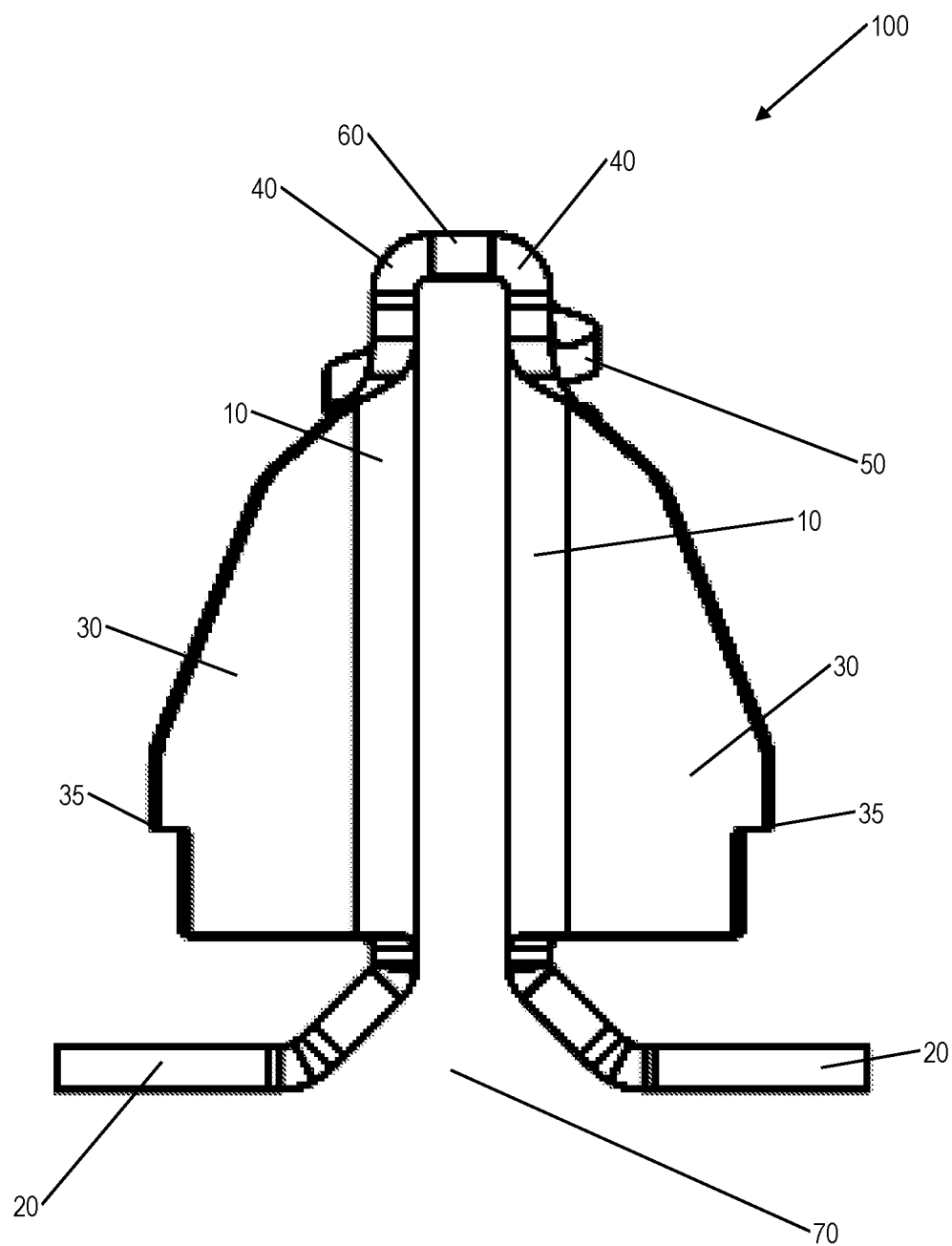
FIG. 3 is another side view of a fastener clip configured to receive a nut, in accordance with some embodiments.

FIG. 3 is another side view of a fastener clip configured to receive a nut, in accordance with some embodiments.

Figure 4:
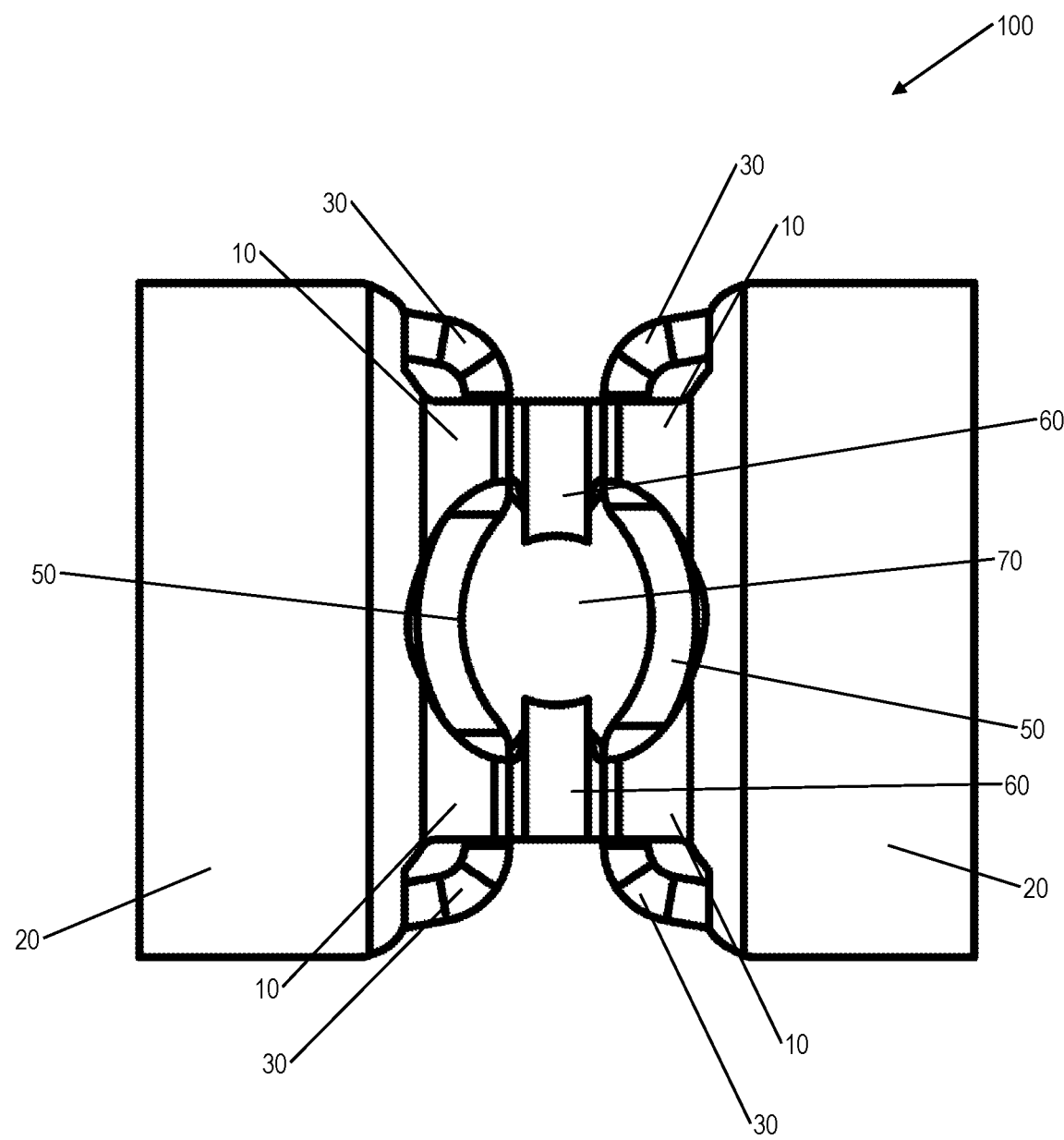
FIG. 4 is a bottom view of a fastener clip configured to receive a nut, in accordance with some embodiments.

FIG. 4 is a bottom view of a fastener clip configured to receive a nut, in accordance with some embodiments.

In some embodiments, fastener clip 100 may be used to couple two objects together. For example, fastener clip 100 may be used to couple together a panel or another automotive component to an automotive chassis.

In some embodiments, fastener clip 100 comprises four legs 10, with a pair of legs on each of side of the clip. In some embodiments, each leg in each of the pair of legs 10 may be coupled using threads 50 (with two sets of threads 50 in such an embodiment). In some embodiments, the material connecting pairs of legs 10 may be shaped into threads 50. In some embodiments, each of the two sets of threads 50 may be shaped into half barrels such that the two sets of threads 50 together form a threaded barrel. The two sets of threads may be appropriately offset to accommodate a screw being threaded through the formed barrel. Fastener clip 100 may also include thread stops 60 at the top of threads 60. Thread stops 60 may be configured to provide increased threading resistance to indicate to a user inserting a screw into the clip that the screw being threaded into fastener clip 100 has reached thread stops 60. The treaded barrel may be configured to receive a threaded screw through opening 70.

In some embodiments, fastener clip 100 may also include four wings/paddles 30 that may be respectively attached to each of legs 10. Wings 10 may include ledges/cutouts 35, with which fastener clip 100, through wings 30 may be configured to attach to the edges/perimeter of a slot in chassis, for example. Wings 30 may extend from the sides of legs 10 and then may be bent at an angle (close to 90 degrees, in some embodiments) toward feet 20 as is shown in the figures. As such, by compressing/pushing feet 20 toward each other, wings 30 and ledges 35 are pushed away from the edges/perimeter of a slot in a chassis thus releasing the clip from the chassis.

In some embodiments, each of two feet 20 is configured to couple together a pair of legs 10 at the bottom of each of the pair of legs 10. Feet 20 may be configured to provide a stop of how far into a slot fastener clip 100 may be inserted. That is, faster clip 100 may be inserted into a slot until the top surfaces of feet 20 engage the chassis. In addition, feet 20 may be configured to facilitate removal of fastener clip 10 form a slot. For example, feet 20 may be pressed together toward the middle of slot, pushing legs 10 together and consequently squeezing the pairs of wings 30/ledges 35 together enough for fastener clip 100 to be released.

In some embodiments, clip 100 may also include top portions 40, with each of top portions 40 coupling two of legs 10 together as is shown in the figures. In some embodiments, top portions may be shaped in such a way to facilitate the insertion of clip 100 into a slot. For example, top portions 40 may be appropriately tapered.

In some embodiments, fastener clip 100 may be stamped/shaped out from a single piece of metal, such as steel. After cutting and bending into the right shape, the two half-barreled sides may be formed by pressing the two using some form of a half cylinder shape in each half.

Figure 5:
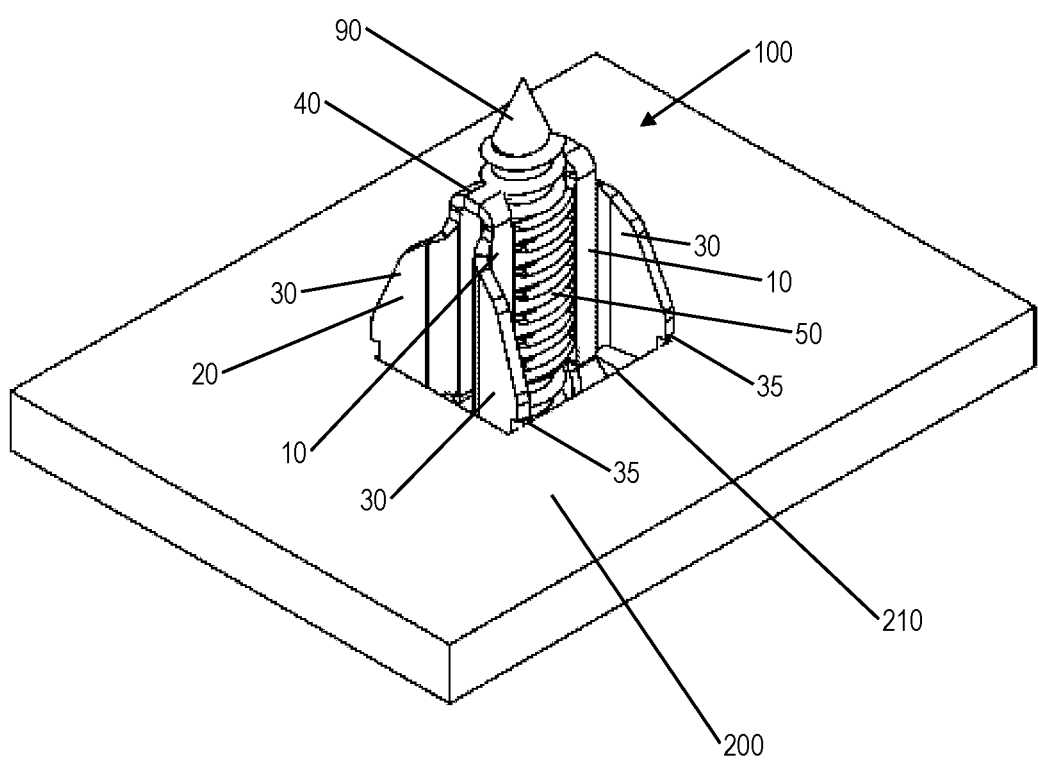
FIG. 5 is a perspective view of a fastener clip attached to a chassis, in accordance with some embodiments.

FIG. 5 is a perspective view of a fastener clip attached to a chassis, in accordance with some embodiments.

Figure 6:
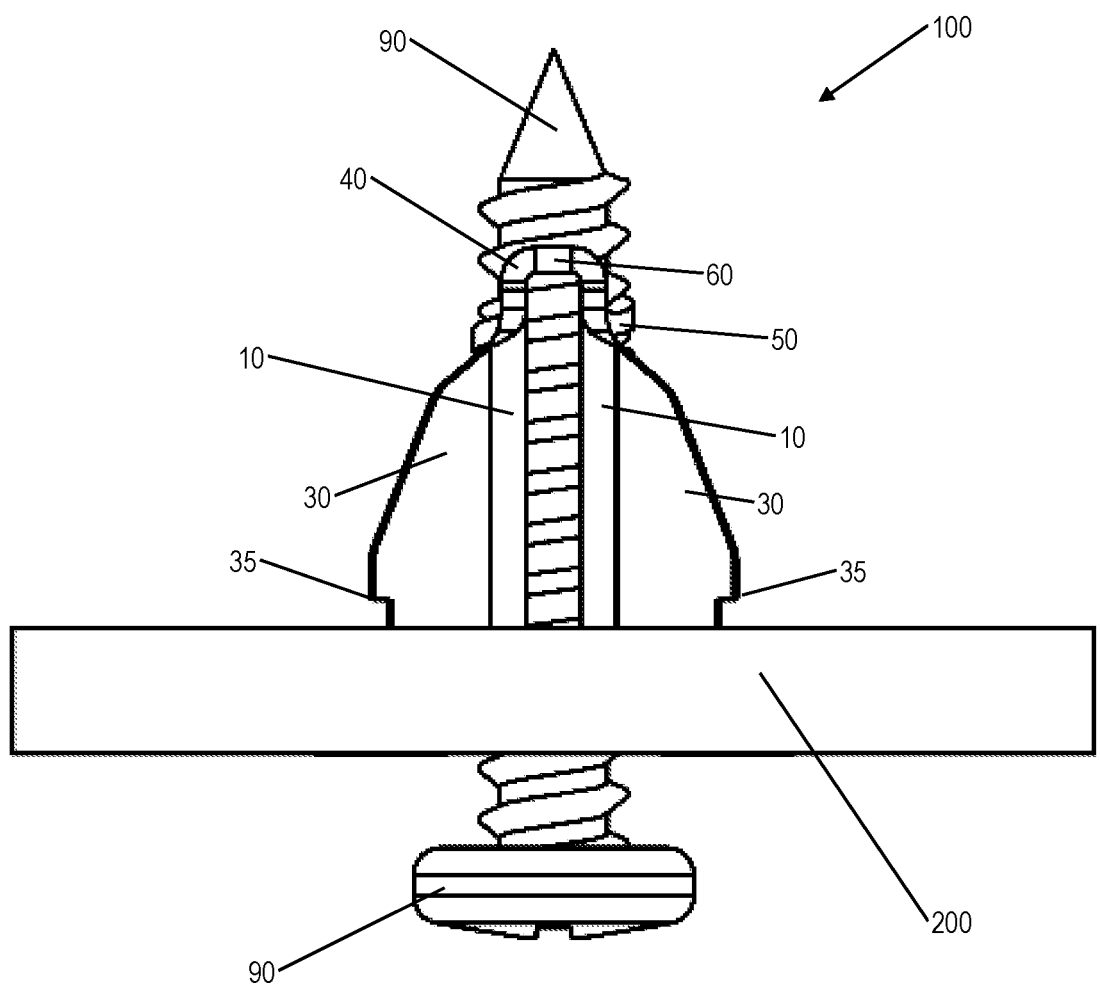
FIG. 6 is a side view of a fastener clip attached to a chassis, in accordance with some embodiments.

FIG. 6 is a side view of a fastener clip attached to a chassis, in accordance with some embodiments.

Figure 7:
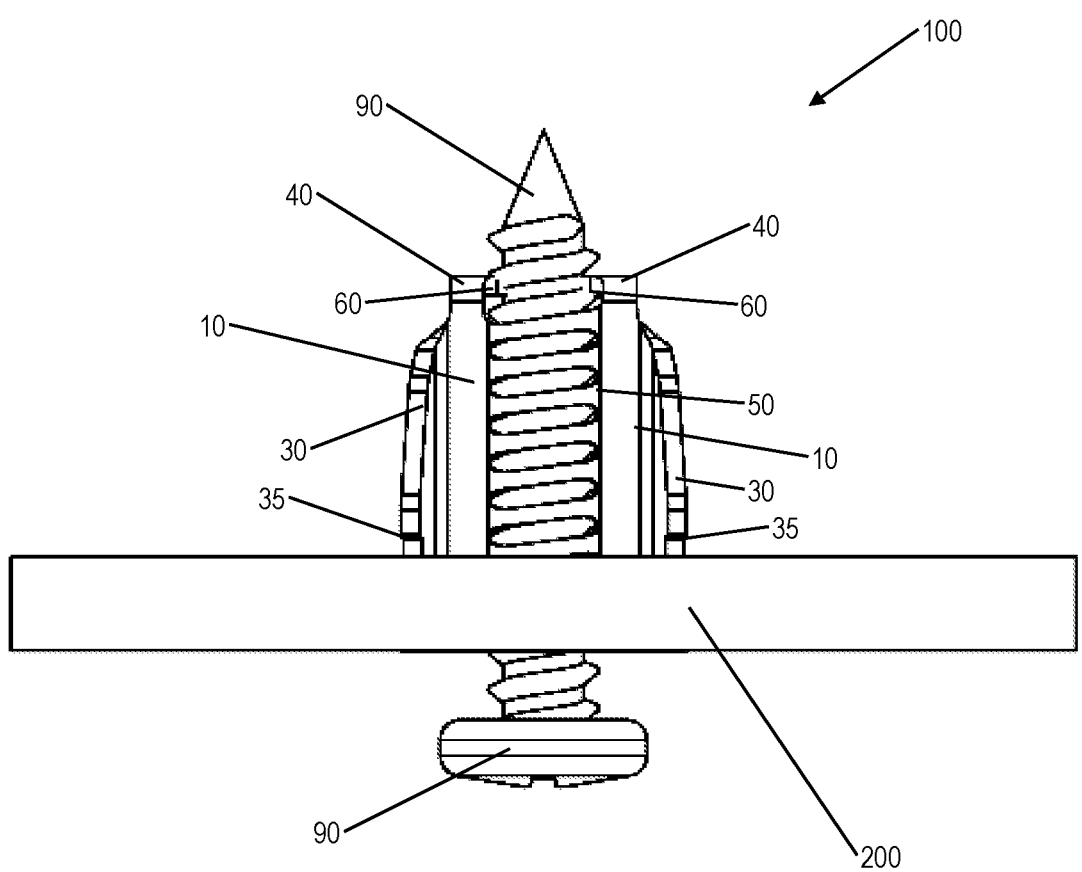
FIG. 7 is another side view of a fastener clip attached to a chassis, in accordance with some embodiments.

FIG. 7 is another side view of a fastener clip attached to a chassis, in accordance with some embodiments.

In some embodiments, fastener clip 100 may be configured to fit and attach to a slot in a chassis, such as slot 210 of chassis 200. Feet 20 (not shown here) are configured to determine how far into the slot fastener clip 100 is permitted to be inserted. Wings 30 are configured to slightly bend inwards as the fastener clip is being inserted into slot 210. Once fastener clip 100 is fully inserted into slot 210, ledges 35 reach the inner edge of slot 210, at which point, wings 30 spring back to substantially their original position. In addition, ledges 35 are now partially over the edge of the chassis in such a way that fastener clip 100 snaps into the slot and may not be easily extracted out of the slot.

It should be noted that fastener clip 100, if desired, may be removed from the slot by pushing together feet 20. Pushing the feet together also pushes the wings together, which causes ledges 35 to move back over the slot and way from the edge/perimeter of the slot, which allows faster clip 100 to be removed from the slot.

Screw 90 may be threaded into fastener clip 100 against both sets of threads 50, as the two sets of threads 50 together form a barrel into which screw 90 can thread. Screw 90 may be used for attaching various components to chassis 200, such as panels, for example, by passing the screw first through a hole in the panel and then threading the screw into threads 50. Thread stops 60 may be used as indicators of how far into fastener clip 10 screw 90 may be threaded, such that a user threading screw 90 into fastener clip 100 may be given feedback as to when the screw has reached the top of the clip.

In some embodiments, the insertion of screw 90 into fastener clip 90 prevents the removal of the clip from the chassis as the presence of screw 90 prevents the pushing together of feet 20 and thus preventing the collapse of wings 30 and ledges 35 past the edge of slot 210. In some embodiments, the fastener clip may be removed only by removing screw 90 first. As such, when assembled fully, the security of attachment of components to the chassis is increased.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

One or more embodiments of the invention are described above. It should be noted that these and any other embodiments are exemplary and are intended to be illustrative of the invention rather than limiting. While the invention is widely applicable to various types of systems, a skilled person will recognize that it is impossible to include all of the possible embodiments and contexts of the invention in this disclosure. Upon reading this disclosure, many alternative embodiments of the present invention will be apparent to persons of ordinary skill in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations that follow those terms. Accordingly, a system, method, or other embodiment that comprises a set of elements is not limited to only those elements and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A fastener clip comprising:
   a top portion;
   a first pair of legs and a second pair of legs, wherein the first pair of legs and the second pair of legs are coupled together by the top portion, wherein the first pair of legs and the second pair of legs are free to move apart from and closer to each other at a bottom end;
   a first pair of wings and a second pair of wings, wherein each of the wings of the first pair of wings is attached along each of the legs of the first pair of legs, wherein each of the wings of the second pair of wings is attached along each of the legs of the second pair of legs, wherein each of the wings of the first pair of wings and each of the wings of the second pair of wings comprise ledges;
   a first set of threads and a second set of threads, wherein the first set of threads is coupled to each of the legs of the first pair of legs forming a first half-barrel between the legs of the first pair of legs, and wherein the second set of threads is coupled to each of the legs of the second pair of legs forming a second half-barrel between the legs of the second pair of legs;
   a screw,
      wherein the fastener clip is configured to attach to a slot in a chassis based at least upon:
         the fastener clip being configured to be inserted into the slot and the first pair of wings and the second pair of wings being configured to bend inwards,
         the first pair of wings and the second pair of wings being configured to spring back out in response to the ledges reaching an inner edge of the slot in the chassis, and the ledges being configured to be over the inner edge of the slot in the chassis,
      wherein the first half-barrel of the first set of threads and the second half-barrel of the second set of threads form a thread barrel,
      wherein the fastener clip is configured to couple a component to the chassis based at least upon the screw being configured to be coupled to the component and being configured to be screwed into the thread barrel.

2. The fastener clip of claim 1, wherein the fastener clip comprises a first foot and a second foot, wherein the first foot is attached to a bottom of the first pair of legs and wherein the second foot is attached to a bottom of the second pair of legs, wherein the first foot and the second foot are configured to provide a stopping point for the fastener clip in response to the fastener clip being configured to be inserted into the slot based at least upon the first foot and the second foot being configured to rest against the chassis at the stopping point.

3. The fastener clip of claim 2, wherein the fastener clip is configured to be removed from the chassis based at least upon pushing the ledges off the inner edge of the chassis by pushing together the first foot and the second foot.

4. The fastener clip of claim 3, wherein the screw is configured to prevent removal of the fastener clip from the chassis based at least upon the screw resting against and obstructing a collapsing of the first pair of wings and the second pair of wings when the screw is threaded into thread barrel.

5. The fastener clip of claim 1, further comprising thread stops toward a top of the fastener clip, wherein the thread stops extend into a path of the screw and are configured to provide resistance against the screw to indicate to a screw user that the screw has reached the top of the fastener clip.

6. The fastener clip of claim 1, wherein each one of the four wings is bent at an angle close to 90 degrees to the top portion.

7. A fastener assembly system comprising:
   a component;
   a chassis section comprising a slot;
   a fastener clip, wherein the fastener clip comprises:
      a top portion;
      a first pair of legs and a second pair of legs, wherein the first pair of legs and the second pair of legs are coupled together by the top portion, wherein the first pair of legs and the second pair of legs are free to move apart from and closer to each other at a bottom end;
      a first pair of wings and a second pair of wings, wherein each of the wings of the first pair of wings is attached along each of the legs of the first pair of legs, wherein each of the wings of the second pair of wings is attached along each of the legs of the second pair of legs, wherein each of the wings of the first pair of wings and each of the wings of the second pair of wings comprise ledges;
      a first set of threads and a second set of threads, wherein the first set of threads is coupled to each of the legs of the first pair of legs forming a first half-barrel between the legs of the first pair of legs, and wherein the second set of threads is coupled to each of the legs of the second pair of legs forming a second half-barrel between the legs of the second pair of legs;
      a screw;
         wherein the fastener clip attaches to the slot in the chassis based at least upon:
            the fastener clip being configured to be inserted into the slot and the first pair of wings and the second pair of wings bending inwards, the first pair of wings and the second pair of wings being configured to spring back out in response to the ledges reaching an inner edge of the slot in the chassis, and the ledges being over the inner edge of the slot in the chassis, wherein the first half-barrel of the first set of threads and the second half-barrel of the second set of threads form a thread barrel, wherein the fastener clip is configured to couple the component to the chassis based at least upon the screw being coupled to the component and being screwed into the thread barrel.

8. The fastener assembly system of claim 7, wherein the fastener clip comprises a first foot and a second, wherein the first foot is attached to a bottom of the first pair of legs and wherein the second foot is attached to a bottom of the second pair of legs, wherein the first foot and the second foot are configured to provide a stopping point for the fastener clip being inserted into the slot based at least upon the first foot and the second foot resting against the chassis at the stopping point.

9. The fastener assembly system of claim 8, wherein the fastener clip is configured to be removed from the chassis based at least upon pushing the ledges off the inner edge of the chassis by pushing together the first foot and the second foot.

10. The fastener assembly system of claim 9, wherein the screw is configured to prevent removal of the fastener clip from the chassis based at least upon the screw resting against and obstructing a collapsing of the first pair of wings and the second pair of wings when the screw is threaded into thread barrel.

11. The fastener assembly system of claim 7, further comprising thread stops toward a top of the fastener clip, wherein the thread stops extend into a path of the screw and are configured to provide resistance against the screw to indicate to a screw user that the screw has reached the top of the fastener clip.

12. The fastener assembly system of claim 7, wherein each one of the four wings is bent at an angle close to 90 degrees to the top portion.

* * * * *